United States Patent
Anderson

(10) Patent No.: US 7,587,514 B2
(45) Date of Patent: *Sep. 8, 2009

(54) TRANSMISSION BANDWIDTH AND MEMORY REQUIREMENTS REDUCTION IN A PORTABLE IMAGE CAPTURE DEVICE

(75) Inventor: Eric C. Anderson, Gardnerville, NV (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 92 days.

This patent is subject to a terminal disclaimer.

(21) Appl. No.: 11/857,100

(22) Filed: Sep. 18, 2007

(65) Prior Publication Data

US 2008/0043111 A1     Feb. 21, 2008

Related U.S. Application Data

(63) Continuation of application No. 09/680,612, filed on Oct. 6, 2000, now Pat. No. 7,287,088.

(51) Int. Cl.
    G06F 13/00     (2006.01)
(52) U.S. Cl. .................... 709/235; 709/230
(58) Field of Classification Search ............ 709/235, 709/230
    See application file for complete search history.

(56) References Cited

U.S. PATENT DOCUMENTS

| | | |
|---|---|---|
| 5,249,230 A | 9/1993 | Mihm |
| 5,396,546 A | 3/1995 | Remillard et al. |
| 5,430,827 A | 7/1995 | Rissanen |
| 5,477,264 A | 12/1995 | Sarbadhikari et al. |
| 5,552,776 A | 9/1996 | Wade et al. |
| 5,606,365 A | 2/1997 | Maurinus et al. |
| 5,684,918 A | 11/1997 | Abecassis |
| 5,737,491 A | 4/1998 | Allen et al. |
| 5,806,005 A | 9/1998 | Hull et al. |
| 5,821,523 A | 10/1998 | Bunte et al. |

(Continued)

FOREIGN PATENT DOCUMENTS

EP     0930770     7/1999

(Continued)

OTHER PUBLICATIONS

Pan, L., "A Digital Camera With A Function Of Picture Transmission," Database EPODOC, European Patent Office, XP001091526 [TW 403853B (Inventec Corp) Sep. 1, 2000].

(Continued)

*Primary Examiner*—Kenneth R Coulter

(57) ABSTRACT

A system and method for reducing storage and transmission bandwidth requirements of a portable image capture device capable of establishing a communications connection on a network are disclosed. The method includes assigning an image identifier to captured images uploaded to a server on a network, wherein each of the images is stored in an image file having a particular size. The size of each of the image files corresponding to the uploaded images on the image capture device may then be reduced, thereby reducing storage requirements. In response to a user request to apply an action to one of the uploaded images, only the image identifier of the image and the requested action are transmitted to the server, thereby eliminating the need to retransmit the image and reducing transmission bandwidth requirements.

11 Claims, 7 Drawing Sheets

U.S. PATENT DOCUMENTS

| | | | |
|---|---|---|---|
| 5,845,265 | A | 12/1998 | Woolston |
| 5,905,736 | A | 5/1999 | Ronen et al. |
| 5,973,731 | A | 10/1999 | Schwab |
| 5,999,968 | A | 12/1999 | Tsuda |
| 6,006,039 | A | 12/1999 | Steinberg et al. |
| 6,012,088 | A | 1/2000 | Li et al. |
| 6,017,157 | A | 1/2000 | Garfinkle et al. |
| 6,035,323 | A | 3/2000 | Narayen et al. |
| 6,064,671 | A | 5/2000 | Killian |
| 6,067,571 | A | 5/2000 | Igarashi et al. |
| 6,069,648 | A | 5/2000 | Suso et al. |
| 6,073,241 | A | 6/2000 | Rosenberg et al. |
| 6,076,109 | A | 6/2000 | Kikinis |
| 6,147,742 | A | 11/2000 | Bell et al. |
| 6,167,469 | A | 12/2000 | Safai et al. |
| 6,185,551 | B1 | 2/2001 | Birrell et al. |
| 6,185,611 | B1 | 2/2001 | Waldo et al. |
| 6,223,190 | B1 | 4/2001 | Aihara et al. |
| 6,226,752 | B1 | 5/2001 | Gupta et al. |
| 6,269,481 | B1 | 7/2001 | Perlman et al. |
| 6,281,874 | B1 | 8/2001 | Sivan et al. |
| 6,301,586 | B1 | 10/2001 | Yang et al. |
| 6,301,607 | B2 | 10/2001 | Barraclough et al. |
| 6,337,712 | B1 | 1/2002 | Shiota |
| 6,453,361 | B1 | 9/2002 | Morris |
| 6,502,195 | B1 | 12/2002 | Colvin |
| 6,529,522 | B1 | 3/2003 | Ito et al. |
| 6,538,663 | B2 | 3/2003 | Kamei |
| 6,571,271 | B1 | 5/2003 | Savitzky et al. |
| 6,573,927 | B2 | 6/2003 | Parulski et al. |
| 6,581,094 | B1 | 6/2003 | Gao |
| 6,583,799 | B1 | 6/2003 | Manolis et al. |
| 6,608,973 | B2 | 8/2003 | Masera |
| 6,623,528 | B1 | 9/2003 | Squilla |
| 6,625,812 | B2 | 9/2003 | Abrams et al. |
| 6,628,325 | B1 | 9/2003 | Steinberg et al. |
| 6,636,259 | B1 | 10/2003 | Anderson et al. |
| 6,647,409 | B1 | 11/2003 | Sherman et al. |
| 6,650,831 | B1 | 11/2003 | Thompson |
| 6,657,702 | B1 | 12/2003 | Chui et al. |
| 6,715,003 | B1 | 3/2004 | Safai et al. |
| 6,762,791 | B1 | 7/2004 | Schuetzle |
| 6,784,924 | B2 | 8/2004 | Ward et al. |
| 6,832,101 | B1 | 12/2004 | Kino |
| 6,930,709 | B1 | 8/2005 | Creamer et al. |
| 7,117,519 | B1 | 10/2006 | Anderson et al. |
| 7,287,088 | B1 | 10/2007 | Anderson |
| 2002/0054224 | A1 | 5/2002 | Wasula et al. |
| 2004/0174440 | A1 | 9/2004 | Kojima et al. |

FOREIGN PATENT DOCUMENTS

| | | |
|---|---|---|
| WO | WO9921336 | 4/1999 |
| WO | WO9948276 | 9/1999 |

OTHER PUBLICATIONS

JP 2000047988 (Tozono) Jul. 28, 1998 (abstract) [online] Retrieved from the PAJ database.

JP 09233453 Canon Inc.) Sep. 5, 1997 (abstract) [online] Retrieved from the PAJ database.

JP 10105517 (Takasaki) Apr. 24, 1998 (abstract) [online] Retrieved from the PAJ database.

TRANSMISSION BANDWIDTH AND MEMORY REQUIREMENTS REDUCTION IN A PORTABLE IMAGE CAPTURE DEVICE

CROSS-REFERENCE TO RELATED APPLICATIONS

This application is a continuation of U.S. patent application Ser. No. 09/680,612, titled "Transmission Bandwidth And Memory Requirements Reduction In A Portable Image Capture Device", filed on Oct. 6, 2000, now issued as U.S. Pat. No. 7,287,088 and assigned to the assignee of the present application, the entire contents of which are incorporated here by reference.

U.S. patent application Ser. No. 09/680,612 is related to U.S. patent application Ser. No. 09/625,824 entitled "Automatically Configuring A Web-Enabled Digital Camera To Access The Internet," now U.S. Pat. No. 6,636,259; and to U.S. patent application Ser. No. 09/626,418 entitled "Method And System For Selecting Actions To Be Taken By A Server When Uploading Images," now U.S. Pat. No. 7,117,519 which are assigned to the assignee of the present application, which are herein incorporated by reference.

FIELD OF THE INVENTION

The present invention relates the storage and transmission of digital images, and more particularly to a method and system for reducing transmission bandwidth and storage requirements of an image capture device.

BACKGROUND OF THE INVENTION

As the popularity of digital cameras continues grow, the use of on-line photo sharing websites for storing and sharing digital images is becoming more prevalent.

The most common method for getting the digital images to the photo sharing websites is to load the images from the digital camera to a personal computer (PC) and use the Internet connection on the PC to upload images to the photo site. Today, however, hand-held electronic devices are emerging, including digital cameras that have the capability to connect directly to the Internet without the use of the PC. For example, the assignee of the present application has developed an approach to uploading images to the Web. In this approach, an e-mail software application is loaded into a digital camera capable of running software applications that allows the user to e-mail images directly from the camera. The user simply connects his or her digital camera to a cell phone or a modem, runs the e-mail application, and selects the desired images and e-mail recipients. The selected images are then sent to the e-mail recipients as attachments.

A more advanced approach is to provide the digital camera with cell phone-like functionality in which the camera establishes an Internet connection with the photo sharing website by dialing an 800 number, for example, and automatically uploads the images.

One prohibitive factor to the widespread adoption of digital imaging is cost. Digital cameras are already relatively expensive to purchase, and providing digital cameras with Internet connectivity for uploading images to the Internet will only add to the expense. And ever increasing images sizes means that digital cameras will require larger memories, further adding to the expense. What's more, consumers will have to pay for the bandwidth consumed during transmission of images to the photo-sharing site. The cost for transmitting images will be a function of the size and number of the images, the speed of the modem or wireless medium, and the cost of calling the 800 number.

One reason why digital cameras require so much transmission bandwidth is because images stored on the digital camera are oftentimes transmitted over the Internet more than once. For example, consider the example where the user wants to send selected images to ten different work groups at work and selects the same image several times. The user may chose to send images 1, 2, and 8 to group 1, images 2, 5, 8 and 9 to group 2, images 3, 4, 8, and 10 to group, and so on. As can be seen, the same image (#8) must be transmitted over the Internet several times, consuming a large amount of bandwidth.

One way to reduce the bandwidth used transmitting images from the camera is to reduce the size of the image files by using higher compression rates and/or by capturing lower resolution images. However, the digital camera industry is attempting to meet to consumer demand for digital image quality that rivals film images, which may require image sizes of at least 4-10 MB. Using higher compression rates is not viable option because higher compression rates degrade image quality, and capturing lower resolution images is the antithesis of achieving film-quality.

Accordingly, what is needed is a method and system for reducing bandwidth and storage requirements of images transmitted from a digital camera. The present invention addresses such a need.

SUMMARY OF THE INVENTION

The present invention provides a method and system for reducing storage and transmission bandwidth requirements of a portable image capture device capable of establishing a communications connection on a network. In a first aspect of the present invention, a method is provided for reducing bandwidth requirements is provided by assigning an image identifier to captured images uploaded to a server on a network. Thereafter, in response to a user request to apply an action to one of the uploaded images, only the image identifier of the image and the requested action are transmitted to the server. In a second aspect of the present invention, a method for reducing storage requirements is provided by reducing the size of each of the image files corresponding to the uploaded images on the image capture device.

According to the system and method disclosed herein, reducing the image files of each of the uploaded images after image uploading frees memory space for the capture of additional images and reduces storage requirements. And transmitting only the image identifier of the image after an image is uploaded the first time eliminates the need to retransmit the image, thereby reducing transmission bandwidth requirements.

DESCRIPTION OF THE INVENTION

The present invention relates to reducing the transmission bandwidth and storage requirements of a portable image capture device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method and system for reducing storage and bandwidth requirements of a portable image capture device, such as the digital camera. Captured images, which are stored in image files, are transmitted to an online photo-sharing site for permanent storage, and the files of the uploaded images are reduced in size to reduce storage requirements. The uploaded images are thereafter only referred to an image identifier during subsequent server communication, thereby eliminating redundancy in image transmission.

Figure 1:
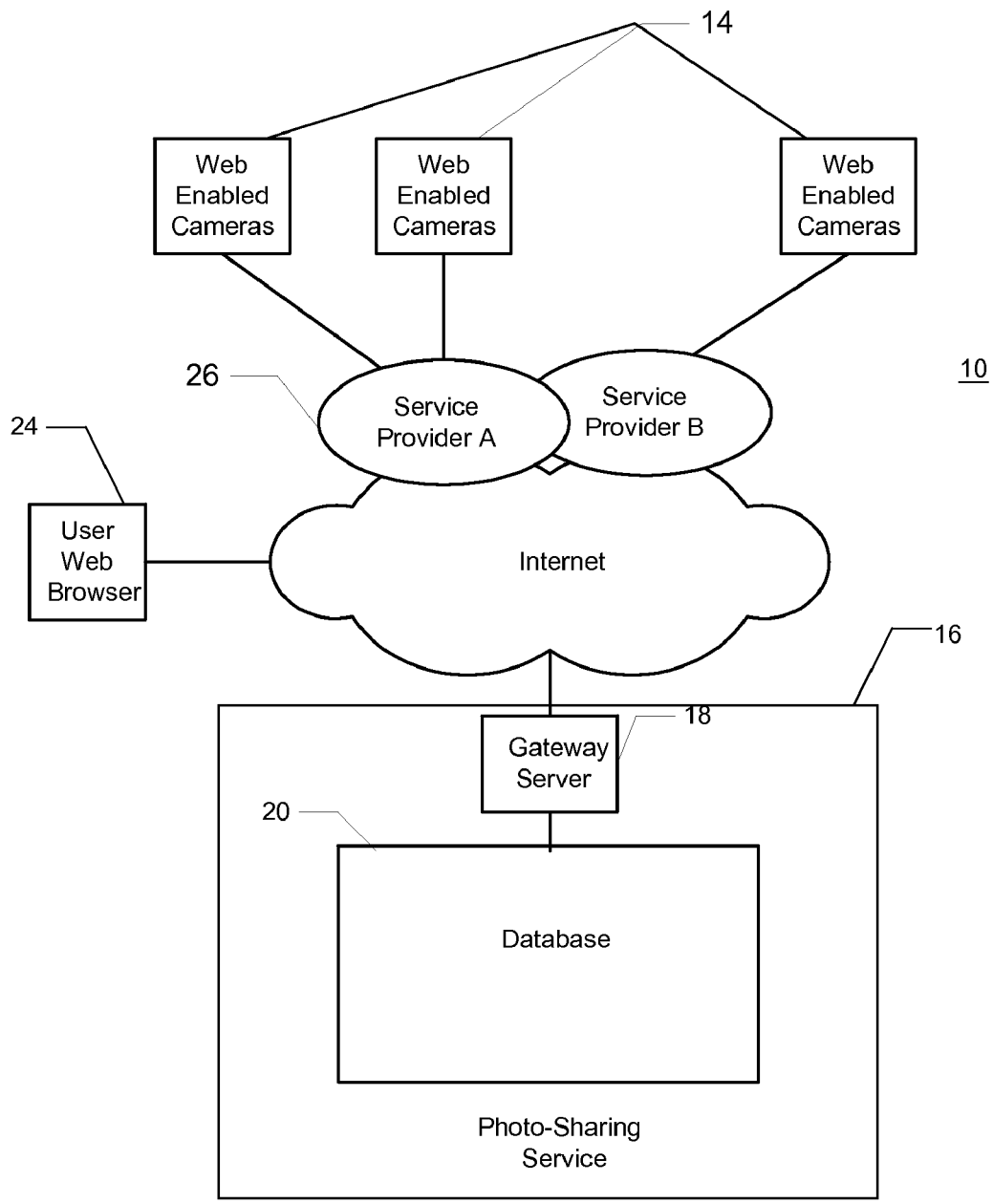
FIG. 1 is a block diagram illustrating an online photo-sharing system in accordance with a preferred embodiment of the present invention.

FIG. 1 is a block diagram illustrating a system for reducing the transmission bandwidth and storage requirements of a portable image capture device in accordance with a preferred embodiment of the present invention. The system will be explained in terms of a preferred embodiment where the image capture device is represented as a digital camera. However, one of ordinary skill in the art will readily recognize that any portable device capable of capturing images could be used, such as a cellphone or PDA equipped with a lens attachment, for instance.

The system includes one or more digital cameras 14 and an online photo-sharing service 16. The digital cameras 14 capture digital images and store the images on an internal memory. Because the digital cameras 14 have limited storage capacity, the digital cameras 14 are provided with the capability of uploading the captured images to the online photo sharing service 16, which has practically unlimited storage capacity. In a preferred embodiment, the cameras 14 are provided with wireless connectivity for connecting to the Internet, and are therefore called "web-enabled" devices, although a wired connection method may also be used. In one embodiment, the cameras 14 may connect to the Internet via a service provider 26, which may include a wireless carrier and/or an Internet service provider (ISP) that is capable of servicing many devices simultaneously.

The online photo-sharing service 16 includes a gateway server 18 for receiving the images and an image database 20 for storing the images. Once uploaded, the images may be stored in the user's account and organized into online web albums. Once the images are stored at the photo-sharing site 16, the images may be viewed and managed over the Internet through a user's web browser 24.

Figure 2:
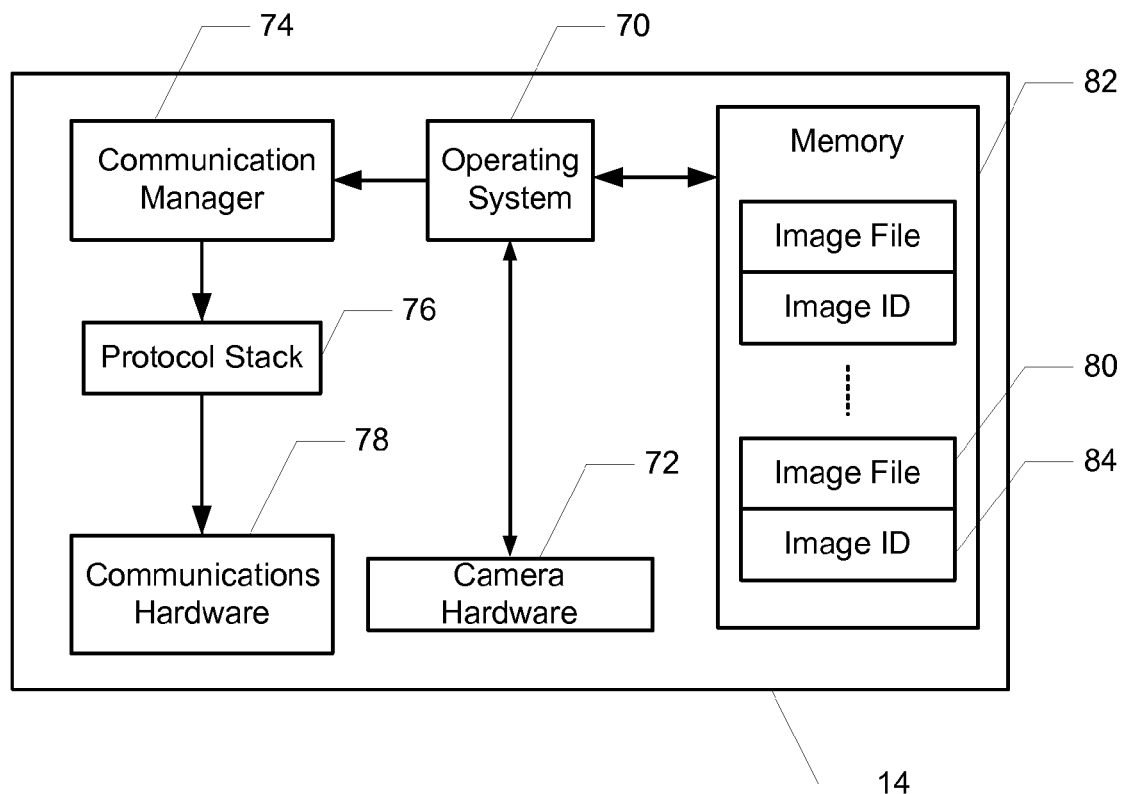
FIG. 2 is a diagram showing a preferred embodiment of a digital camera for use in accordance with the present invention.

Referring now to FIG. 2, a block diagram illustrating an example digital camera architecture is shown for use with the present invention. Preferably, the camera 14 includes a microprocessor-based architecture that runs an operating system 70 for controlling camera hardware 72 and overall functionality of the camera 14 (e.g., taking pictures, storing pictures, and the like). An example of such an operating system 70 is the Digita™ Operating Environment developed by the assignee of the present application. A memory 82, which may comprise flash memory or other type of non-volatile memory, is provided to store captured images as image files 80, explained further below.

The camera 14 also includes communication manager 74 software, and a TCP-IP protocol stack 76, that enables communication via the Internet, as is well-known in the art. The protocol stack 76, under direction of the communications manager interfaces with the communications hardware 78 of camera. The protocol stack 76 includes software APIs and protocol libraries that interface with the communication manager 74, and communication hardware interface drivers that interfaces directly with the various communications hardware 78 the camera 14 must function with (e.g., a Bluetooth transceiver, etc.).

The communications hardware 78 may provide wireless connectivity using anyone of a variety of methods. For example, a cellphone may be used to provide the digital camera 14 with wireless capability, where the camera 14 is connected to the cellphone via a cable or some short-range wireless communication, such as Bluetooth. Alternatively, the camera 14 could be provided with built-in cellphone-like wireless communication. In an alternative embodiment, the digital camera 14 is not wireless, but instead uses a modem for Internet connectivity. The modem could be external or internal. If external, the camera 14 could be coupled to modem via any of several communications means (e.g., USB, IEEE1394, infrared link, etc.). An internal modem could be implemented directly within the electronics of camera 14 (e.g., via a modem ASIC), or alternatively, as a software only modem executing on a processor within camera. As such, it should be appreciated that, at the hardware connectivity level, the Internet connection can take several forms. Hence, it should be appreciated that the present invention is not limited to any particular method of accessing the Internet.

The communication manager 74 communicates with operating system 70, the IP protocol stack 76, and the communications hardware 78 to establish an Internet connection and to transmit information and the image files 80 from the memory 82 to the photo-sharing service 16.

Figure 3:
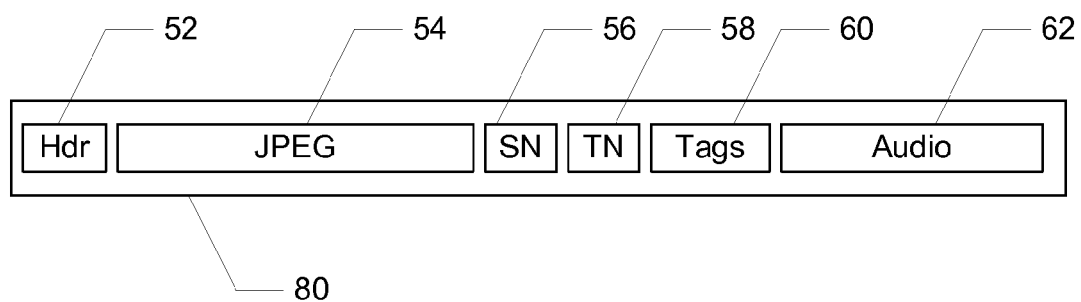
FIG. 3 is a block diagram illustrating a diagram of one embodiment for an image file.

FIG. 3 is a block diagram illustrating a diagram of one embodiment for an image file 80. Image file 80 preferably includes a header 52, image data 54, a screennail 56, a thumbnail 58, image tags 60, and an audio tag 62. Header 52 preferably includes information that identifies and describes the various contents of image file 80. Image data 54 contains actual captured image data, the resolution of which depends on the settings of the camera 14. Image data 54 is typically stored in JPEG format, but may exist in whichever format is appropriate for the current location of image file 80 within the image processing chain of the camera 110. Screennail 56 and thumbnail 58 are each different versions of image data 54 that have varying degrees of reduced resolution for a number of special viewing applications. Image tags 60 include various types of metadata that correspond and relate to particular captured image data 54. Audio tag 62 stores any sound that has been recorded for the image.

The size of the image file 80 depends primarily on the size of the image data 54 and the audio tag 62, which are the largest components of the file 80. For a one-megapixel image, the image data 54 may be 200 k-1 M, the screennail 56 may be 20 k, the thumbnail 58 may be 10 k, the image tags 60 may be 1 k, and the audio tag 62 may be 250 k depending on the size of the sound clip.

As the resolution of digital cameras 14 continues to increase, the size of the image file 80 will also increase, requiring that the digital cameras 14 include higher capacity memories 80, which translates to higher camera cost. Besides the cost of the camera 14, the user 24 must also pay for the bandwidth required to transmit images to the photo-sharing site 16. Larger image sizes and the fact that the user may instruct the camera 14 to transmit a high-resolution image to multiple destinations translates to higher transmission bandwidth requirements and higher expense for the user.

Figure 4:
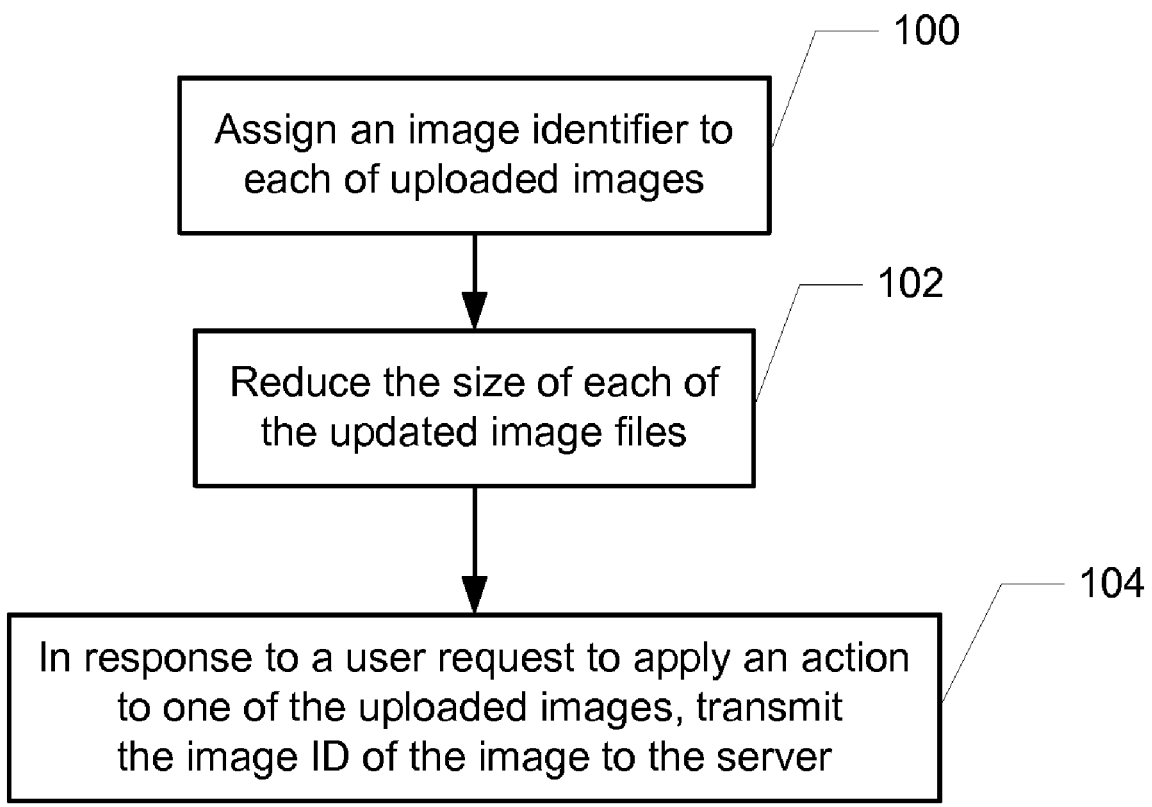
FIG. 4 is a flow chart illustrating the process for reducing storage and bandwidth requirements of the digital camera in accordance with a preferred embodiment of the present invention.

Referring now to FIG. 4, a flow chart is shown illustrating the process for reducing storage and bandwidth requirements of the digital camera 14 in accordance with a preferred embodiment of the present invention. The process begins by assigning a respective image identifier (ID) 84 to each of the images uploaded to the server 18 in step 100. The image files 82 of each of the uploaded images are then optionally reduced in size on the digital camera in step 102. In response to a user request to apply an action to one of the uploaded images, the image ID 84 and the requested action are transmitted to the server 18 in step 104. According to the present invention, because each image is uploaded to the server 18 only once and is thereafter reduced in size to save storage space, and only the image ID 84 is sent to the server 18, both storage requirements and transmission bandwidth required to send the image to multiple destinations from the digital camera are significantly reduced. In addition, as image sizes increase, the amount of reduction in storage and bandwidth required will also increase, which will decrease digital imaging cost for the consumer.

The digital camera 14 operates in at least two operating modes: a capture mode for capturing images, and a play mode for displaying the previously captured images to the user. The captured images may be uploaded to the server 18 in any of the operating modes, preferably as a background process. In one preferred embodiment of the present invention, the camera 14 automatically uploads captured images to the server 18 in capture mode. In another preferred embodiment, the captured images are displayed on the camera 14 in play mode, and the user may choose which images to are to be uploaded. Also in a preferred embodiment, the user may also select actions to apply to the images, either before or after the images are uploaded.

The image ID's 84 may be assigned to the captured images by the camera 14 before uploading or by the server 18 after uploading. If the image ID's 84 are assigned by the camera 14, then the image ID's 84 are uploaded to the server 18 along with the images. If the image ID's 84 are assigned by the server 18, then the server 18 assigns the image IDs 84 to the images after image uploading and returns the assigned Ids 84 to the camera 14. Receipt of the image IDs 84 by the camera 14 acts as acknowledgement of a successful upload and may trigger the reduction of the corresponding image files in the camera 14.

In a preferred embodiment, the image files are reduced by deleting a portion of the file data. For example, the image data 54 may be replaced with the smaller screennail image 56, or the image data 54 may be made smaller through resizing and by then deleting the screennail image 56. By deleting or replacing the JPEG image data with screennail data, the size of the file is reduced dramatically, but sufficient image data exist to display the image to the user in play mode. In an alternative embodiment, the file may be deleted and replaced with just an alias, such as the file name. This results in the most space savings, but at the cost of not being able to show a representation of the image to the user.

Figure 5:
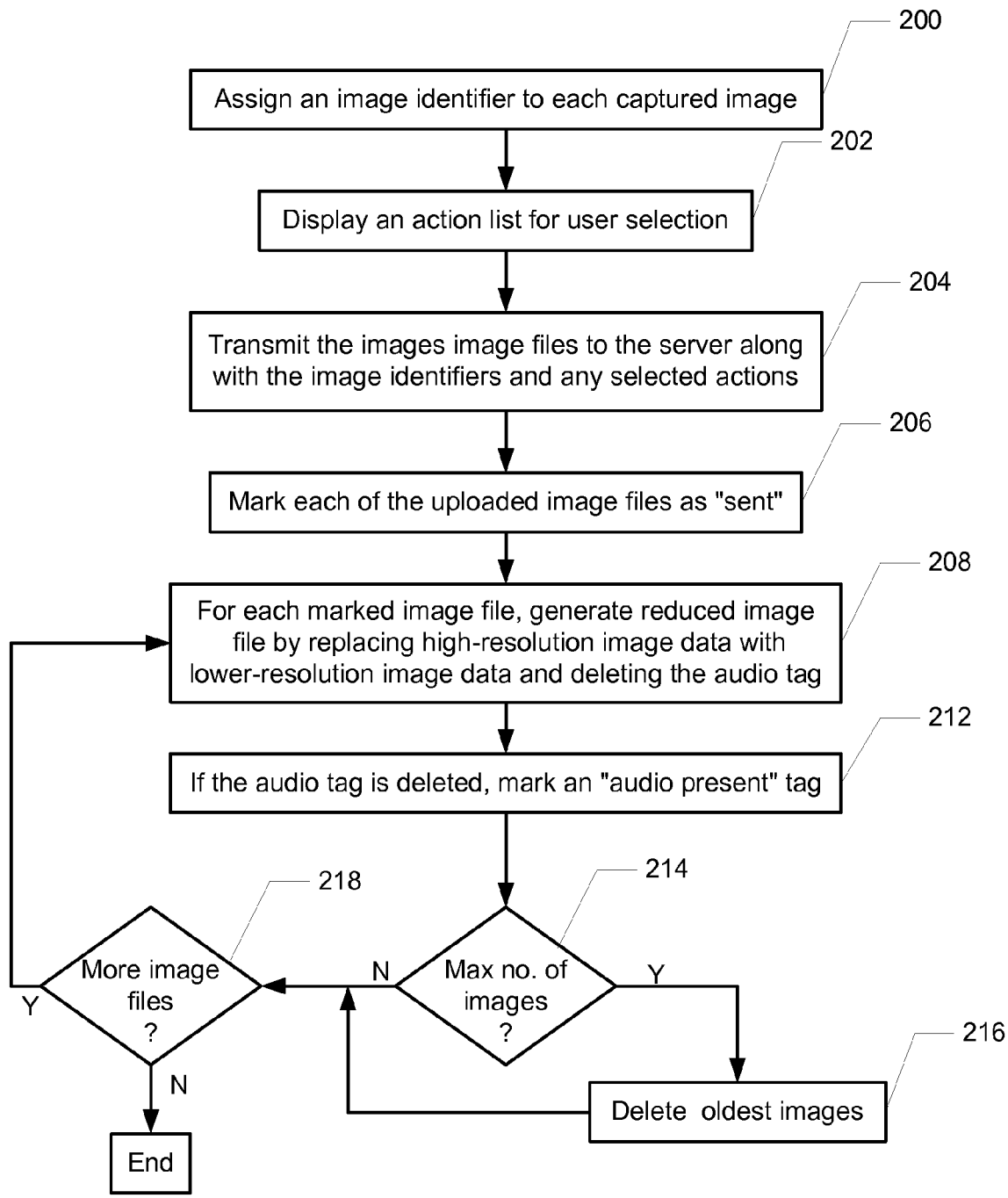
FIG. 5 is a flow chart illustrating the process for reducing storage and bandwidth requirements of the digital camera in capture mode in a preferred embodiment of the present invention.

FIG. 5 is a flow chart illustrating the process for reducing storage and bandwidth requirements of the digital camera in capture mode in a preferred embodiment of the present invention. The process begins by assigning an image identifier 84 (shown in FIG. 2) to each captured image in step 200. In a preferred embodiment, the digital camera names images using an incrementing count of the total number of images captured so that each captured image is provided with a unique name. The image identifier may then be created as a combination of the image name, and data identifying the camera 14, such as the camera serial number and/or the make and model of the camera 14. In a preferred embodiment, the image identifier (ID) 84 may be associated with the image by storing the image identifier 84 in the image file 80 as metadata, or in a separate file stored along with the image.

When an image upload is initiated, the digital camera 14 may display an action list to the user on the digital camera 14 in step 202 so the user may easily select what actions the gateway server 18 should take with respect to the images by selecting the displayed action list items. Examples of action list items include specifying where the images should be stored and/or sent from a particular user or camera, such as sending the images to a list of email addresses for instance, or even performing some type of analysis or calculation on the image data.

Figure 6:
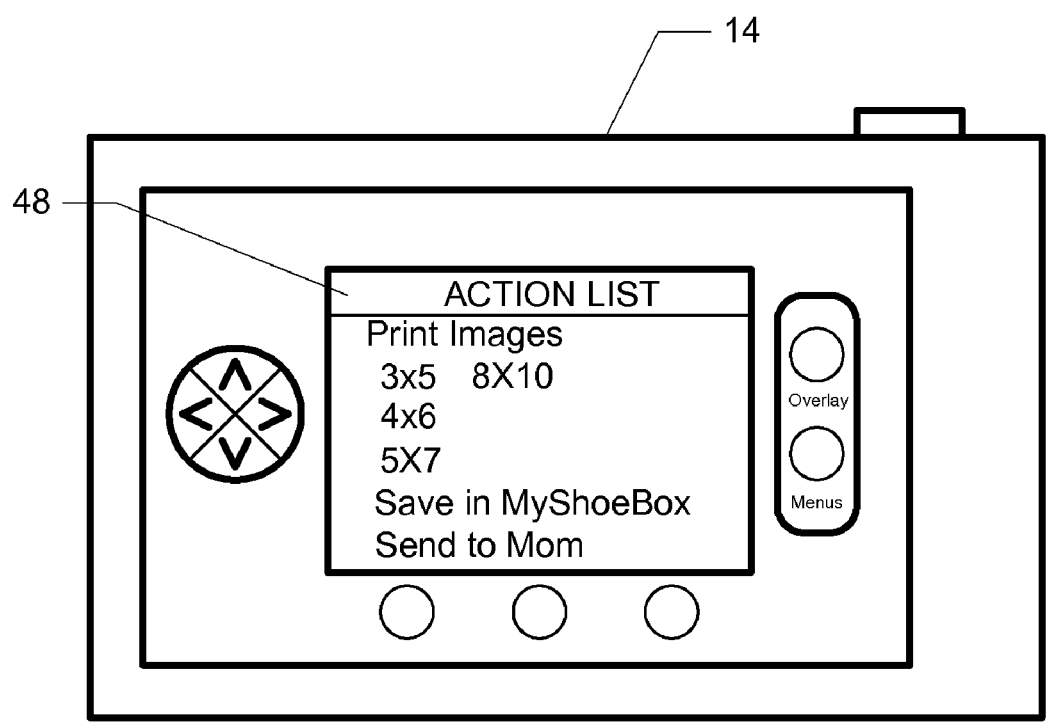
FIG. 6 is a block diagram illustrating an example action list displayed on the LCD screen of the camera.

FIG. 6 is a block diagram illustrating an example action list 48 displayed on the LCD screen of the camera 14. The action list 48 is shown displaying three major options; printing the uploaded images, saving the uploaded images in the user's personal space called a shoebox, and sending the images to Mom. Under the printing option, the user may select from various size prints. Rather than nested menu categories as shown under the printing option, the action list 48 may be displayed with each action listed as a separate item (e.g., "Send 4×8 prints to Mom", "Send 5×7 prints to me").

Referring again to FIG. 5, after the user selects one or more actions from the action list 48, the camera 14 begins transmitting the images image files 80 to the server 18 along with the image IDs 84 (unless the server provides the image IDs) and any selected actions chosen by the user in step 204. Transmitting the images necessarily includes first establishing a network connection with the server 18, and may also include identifying the users' account information.

After the images files 80 are transmitted, the digital camera 14 also marks each of the uploaded image files 80 as "sent" in step 206, preferably using one of the metadata tags 60. Next, the digital camera 14 generates the reduced image files by replacing or the high resolution image 54 with lower resolution data, such as the screennail 56, and optionally deleting any audio tags 62 present in each of the of uploaded image files 80 in step 208. If the audio tag 62 has been deleted, then an "audio present" tag is marked in the reduced image file for later retrieval in step 212. The amount of image file reduction depends on the sizes of the data 54 and the audio tag 62. However, for a one mega pixel image, generating the reduced image files reduces the size of the image file 80 by 7-to-1. After the reduced image files have been generated, the camera 14 may check whether a maximum number of images files 80 are present on the camera 14 in step 214. If the maximum number of images has been reached, then the oldest images may be deleted to further increase storage capacity in step 216. If there are additional marked image files 80 in step 218, the process resumes at step 208. An additional, optional tag may also indicate that images are "protected", and thus not included in the list of potentially images to delete. These "protected" images are those the use wants to keep in the camera, such as family pictures, etc.

Once the uploaded images files 80 are received by the server 18, the server 18 stores the images in the image database 20 and indexes them by their image IDs 84. The sever 18 also applies the requested action to the image files 80.

Figure 7A:
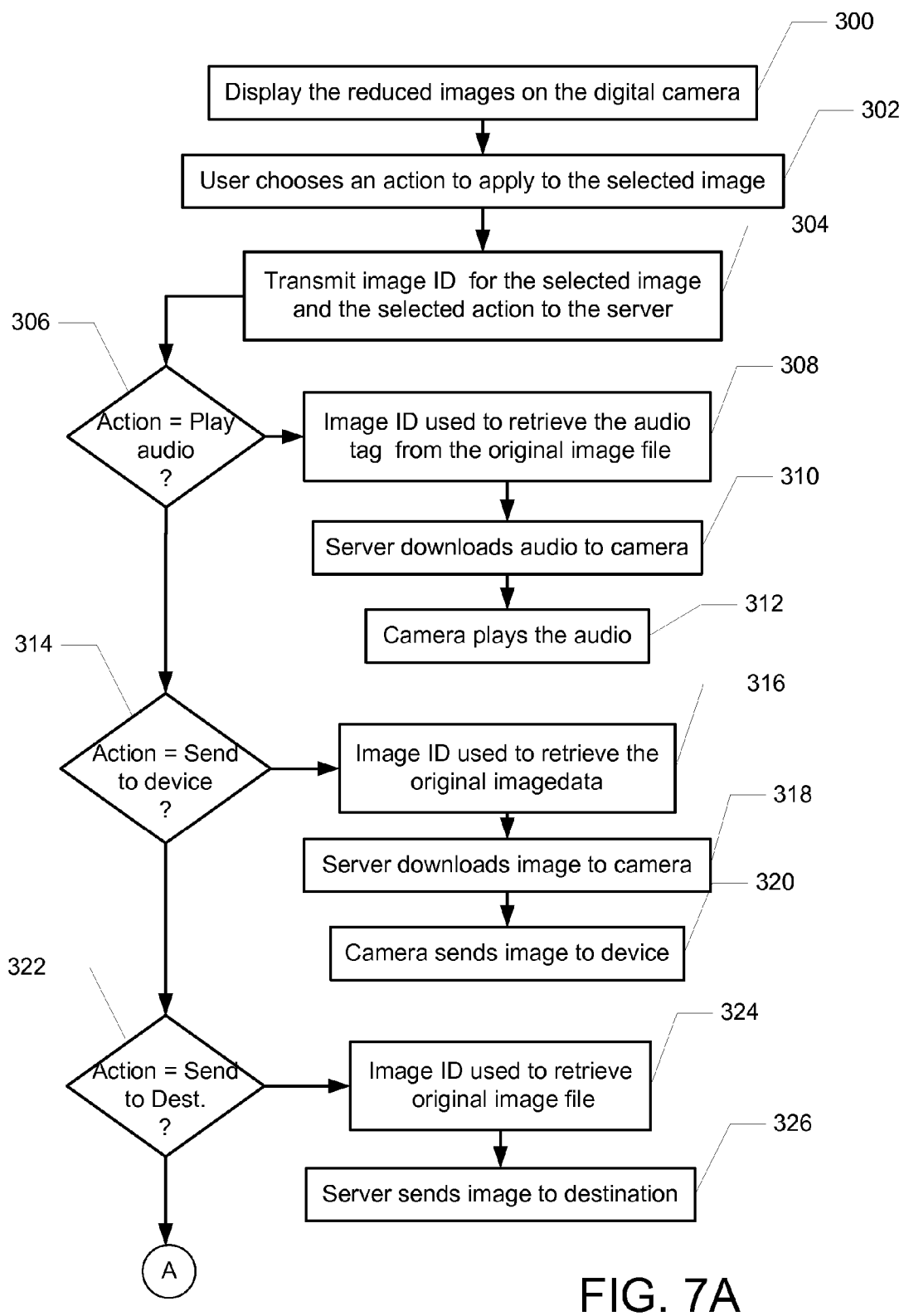
FIGS. 7A and 7B is a flow chart illustrating the process for reducing storage and bandwidth requirements of the digital camera in play mode.
Figure 7B:
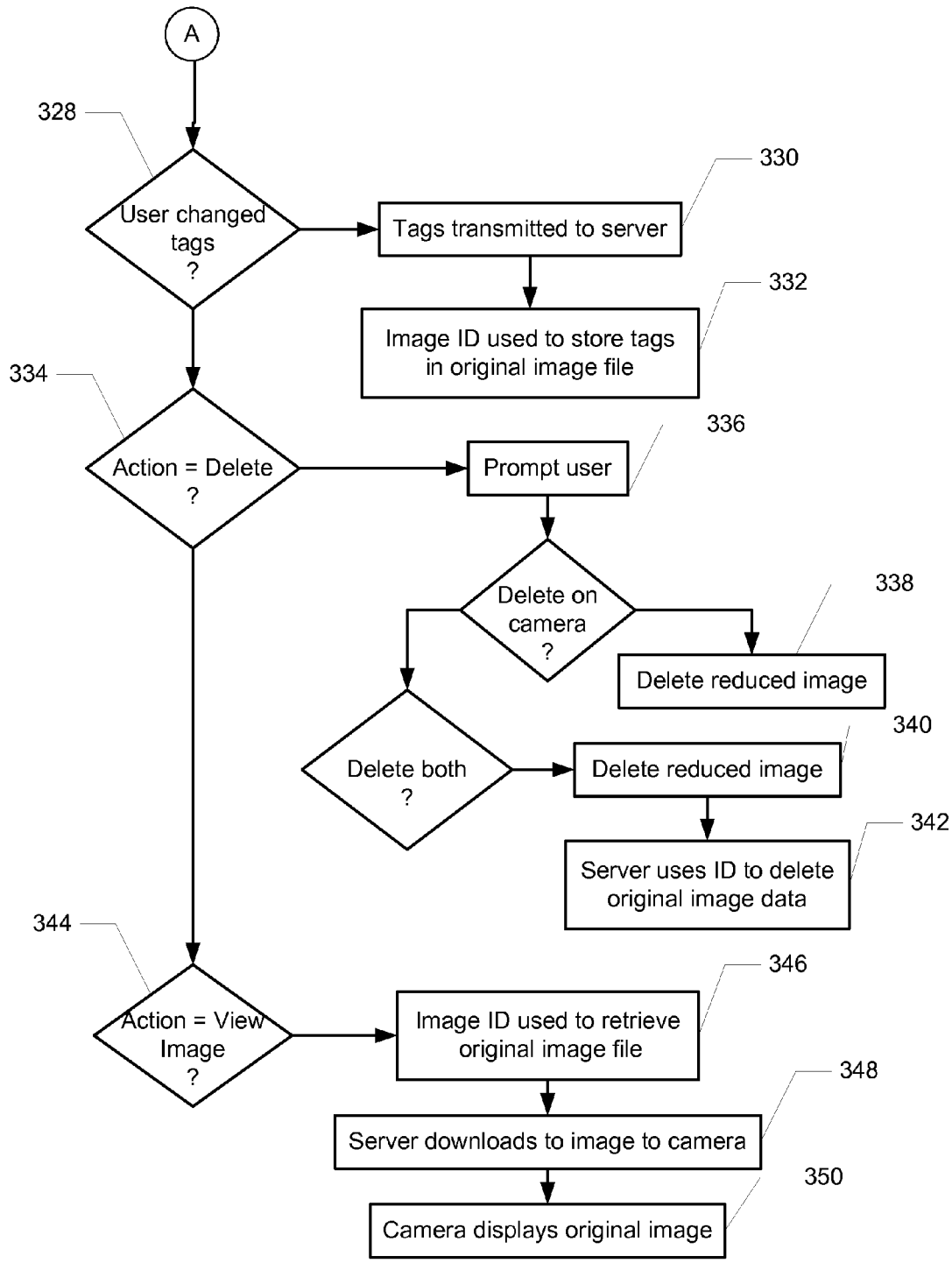

FIG. 7 is a flow chart illustrating the process for reducing storage and bandwidth requirements of the digital camera in play mode. The process begins by displaying the reduced images on the digital camera 14 for user selection in step 300. In a preferred embodiment, the images are displayed with an indication that the images are reduced and a muted sound icon is displayed if the audio has been deleted from the image file. After the user selects one or more images, the user may choose an action to apply to the image, as described above, in step 302. The image ID 84 for the selected image and the selected action are then transmitted to the sever 18 in step 304. If any of the selected images have not been previously uploaded, then they are appropriately ID'd and uploaded, as described above.

If the action selected by the user is to play the audio for the selected image in step 306, then the server 18 uses the image ID 84 to retrieve the audio tag 62 from the original image file 80 in step 308. The server 18 then downloads the retrieved audio tag 62 to the camera 14 in step 310, and the camera 18 plays the audio in step 312. The process of downloading the audio may take some time. Therefore, the user is preferably given the option of canceling the action at any time. In an alternative embodiment, the server re-encodes the audio into a higher compression format using an asymmetric system, such as MP3, which requires much more processing power to encode than to decode. This will make the audio tag much smaller for subsequent download, and can still be played in-camera with no noticeable loss of quality.

If the action selected by the user is to send the selected image from the camera 14 to another device in step 314, then the server 18 uses the image ID 84 to retrieve the original image data in step 316. The server 18 then downloads the retrieved image data to the camera 14 in step 318, and the camera 18 sends the image data to the device in step 320. In an alternative embodiment, the camera 14 may send the reduced image to the other device along with a password so that the device may download the original image data from the server 18. This feature may be very useful for Internet-enabled printers, where the reduced image is sent to the printer and the printer prints with full resolution even though the full resolution image was not actually sent from the camera. This feature can also be implemented via a "signature" key in the metadata, using public key encryption.

If the action selected by the user is to send the selected image from the server 18 to another destination in step 322, then the server 18 uses the image ID 84 to retrieve the original image file 80 in step 324, and sends the image file 80 to the specified destination in step 326.

If the user changes the image tags in the reduced image file in step 328, then the tags are transmitted to the server 18 in step 330 for synchronization. The server 18 then uses the image ID 84 to store the tags in the original image file 80 in step 332.

If the action selected by the user is a request to delete the selected image in step 334, then the user may be prompted in step 336 whether the user wants to delete the reduced image only or wants to delete both the reduced image and the original image file 80. If the user chooses to delete the reduced image, then the reduced image is deleted from the camera 14 in step 338. If the user chooses to delete both the reduced image and the original image file 80, then the reduced image is deleted from the camera 14 in step 340 and the server 18 uses the image ID 84 to delete the original image file 80 in step 342. Ideally, rather than use the same word "delete" for both types of actions, "delete" would only be used for eliminating the image entirely, and some other word, such as "purge" or "remove" would be used to delete the local reduced copy.

If the action selected by the user is to view the original image data in step 344, then the server 18 uses the image ID 84 to retrieve the original image data in step 346, and downloads the image data to the camera 14 in step 348. The camera then displays the image in step 350. Since the camera LCD or video output is typically significantly lower resolution than the image, the only possible use on the camera 14 is when the user wants to magnify the image significantly, such that the reduced image resolution is not sufficient (such as 4× magnification). Alternatively, a desired resolution can be requested, and the server can resize and download the requested reduced resolution—which is significantly smaller than the full resolution, but significantly larger than the in-camera version. This would also reduce bandwidth requirements.

In a preferred embodiment, the user may also want to view a group of images, which are specified by a date range and or by category which are no longer in-camera.

The search criteria would then be sent to the server with the ID of the camera and/or user and the server would use the search criteria to search for matching images taken by the identified camera/user. To speed transmission, the server 18 could return the thumbnail images to the camera 14 as the search results for the user to browse. When the user finds the image(s) he is looking for, a reduced copy of the image can be then downloaded.

A method and system for reducing the storage and transmission bandwidth requirements of a digital camera has been disclosed. According to the present invention, captured images are automatically uploaded to a server and the large image files are reduced in size in the camera to reduce storage requirements. If the user wishes to apply further actions to a previously uploaded image, then the camera only sends the image ID of the image to the server, thereby reducing transmission bandwidth.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing storage and transmission bandwidth requirements of a portable image capture device, the image capture device including means for establishing a communications connection on a network, the method comprising:

receiving captured images uploaded from the image capture device to a hardware server on the network;

assigning an image identifier to the uploaded images by the hardware server;

downloading the image identifiers to the image capture device for association with the corresponding uploaded image;

downloading action information to the image capture device including at least one action that can be applied by the hardware server to the uploaded images; and receiving a request from the portable image capture device to apply the action to at least one of the uploaded images, wherein the request includes the image identifier assigned to the at least one uploaded image and the requested action rather than the image itself, thereby eliminating the need to retransmit the image and reducing transmission bandwidth.

2. The method of claim 1 wherein downloading the image identifiers to the image capture device further includes:

sending the image identifiers to the image capture device to acknowledge receipt of the uploaded images.

3. The method of claim 2 wherein each of the images is stored in an image file, each of the image files having a particular size, the method further including:

after receiving the image identifiers on the image capture device, reducing the size of each of the image files uploaded to the hardware server, and replacing each of the image files with its corresponding reduced size image file, thereby reducing storage requirements in the image capture device.

4. The method of claim 3 wherein reducing the size of each of the image files uploaded to the hardware server further includes:

reducing the size of each file by deleting at least a portion of the image file.

5. The method of claim 4 wherein reducing the size of each of the image files uploaded to the hardware server further includes:

reducing the size of each file by deleting audio from the image file.

6. The method of claim 5 wherein receiving a request from the portable image capture device to apply the action to at least one of the uploaded images further includes:

receiving a request from the user to listen to audio corresponding to the uploaded image;

using the uploaded image identifier to retrieve the audio corresponding to the uploaded image; and downloading the retrieved audio to the image capture device for playing.

7. The method of claim 6 wherein using the uploaded image identifier to retrieve the audio corresponding to the uploaded image further includes:

encoding the audio into a higher compression format on the hardware server to make the audio smaller for downloading and playing, but without a noticeable loss of quality.

8. The method of claim 1 wherein receiving a request from the portable image capture device to apply the action to at least one of the uploaded images further includes:

receiving a request to download a selected image;

using the image identifier to retrieve the selected image; and downloading the selected image.

9. The method of claim 8 wherein receiving a request to download a selected image further includes:

receiving a password with the selected image; and only retrieving the selecting image if the password is verified.

10. The method of claim 8 wherein receiving a request to download a selected image further includes:

receiving a signature key with the selected image; and only retrieving the selecting image if the signature key is verified.

11. The method of claim 1 wherein receiving a request from the portable image capture device to apply the action to at least one of the uploaded images further includes:

receiving a request to delete a selected image; and determining on the image capture device if the uploaded image on the image capture device should be deleted along with the selected image on the hardware server.

* * * * *